United States Patent
Tamura et al.

(10) Patent No.: US 12,233,981 B2
(45) Date of Patent: Feb. 25, 2025

(54) PANNIER AND VEHICLE INCLUDING THE SAME

(71) Applicant: KAWASAKI MOTORS, LTD., Akashi (JP)

(72) Inventors: Hiroshi Tamura, Akashi (JP); Takeshi Kashihara, Akashi (JP); Kiyotaka Akagi, Akashi (JP); Yuki Kanemitsu, Akashi (JP); Jaume Xicola Serrano, Mollet del Valle (ES)

(73) Assignee: KAWASAKI MOTORS, LTD. (JP)

( * ) Notice: Subject to any disclaimer, the term of this patent is extended or adjusted under 35 U.S.C. 154(b) by 130 days.

(21) Appl. No.: 17/581,117

(22) Filed: Jan. 21, 2022

(65) Prior Publication Data

US 2022/0234668 A1     Jul. 28, 2022

(30) Foreign Application Priority Data

Jan. 25, 2021 (JP) ................................ 2021-009895

(51) Int. Cl.
    *B62J 9/23*        (2020.01)
    *B62J 9/27*        (2020.01)

(52) U.S. Cl.
    CPC .. *B62J 9/23* (2020.02); *B62J 9/27* (2020.02)

(58) Field of Classification Search
    CPC ..... B62H 5/001; B62J 9/00; B62J 9/20; B62J 9/23; B62J 9/24; B62J 9/27; B62J 9/30
    USPC ........................................................ 224/430
    See application file for complete search history.

(56) References Cited

U.S. PATENT DOCUMENTS

| 7,207,470 | B2 * | 4/2007 | Akita ......................... | B62J 9/26 224/430 |
| 8,919,158 | B2 * | 12/2014 | Visenzi ..................... | B62J 9/24 224/418 |
| 2004/0149792 | A1 | 8/2004 | Akita et al. | |

(Continued)

FOREIGN PATENT DOCUMENTS

| EP | 1065139 | | 3/2000 | |
| EP | 1065139 A1 * | 1/2001 | ................ | B62J 9/00 |
| EP | 1369344 | | 12/2003 | |

(Continued)

OTHER PUBLICATIONS

WO 0102238 A1 Translation, Ganter A, Jan. 2001 (Year: 2001).*

*Primary Examiner* — Nathan J Newhouse
*Assistant Examiner* — Matthew T Theis
(74) *Attorney, Agent, or Firm* — Snell & Wilmer LLP

(57) ABSTRACT

A pannier includes: a casing body; a lid; an attaching-detaching holder which removably attaches the casing body to the vehicle; an opening-closing holder which attaches the lid in an openable and closeable manner; a cylinder which serves to lock both of the attaching-detaching holder and the opening-closing holder; and first and second movable holders which are movable when the cylinder is unlocked. At a lock position of the cylinder, the first and second movable holders are retained at a position where the casing body is unremovable and the lid is unopenable. At a pannier detaching position off the cylinder, the second movable holder is movable to an attachable-detachable position where the movable holder allows the casing body to be detached. At a pannier opening position of the cylinder, the first movable holder is movable to an openable position where the movable holder allows the lid to be opened.

12 Claims, 11 Drawing Sheets

(56) References Cited

U.S. PATENT DOCUMENTS

2015/0191210 A1    7/2015  Visenzi

FOREIGN PATENT DOCUMENTS

| EP | 2500246 | | 3/2012 | |
|---|---|---|---|---|
| EP | 2500246 | A1 * | 9/2012 | ............. B62H 5/001 |
| EP | 3121097 | A | 1/2017 | |
| JP | 61-043237 | B | 9/1986 | |
| WO | WO-0102238 | A1 * | 1/2001 | ............. B62J 11/00 |
| WO | 2013/044252 | A1 | 3/2013 | |
| WO | WO2015/140380 | | 9/2015 | |

\* cited by examiner

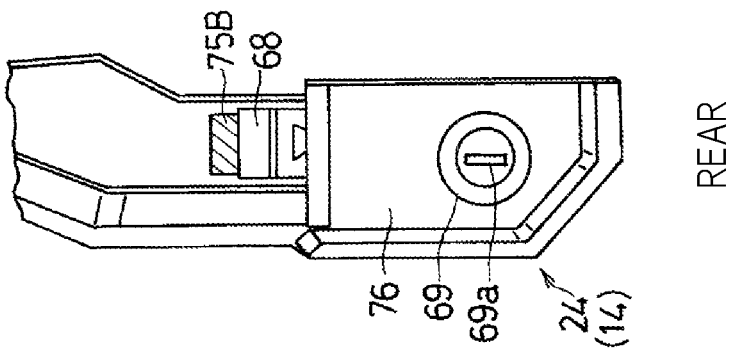
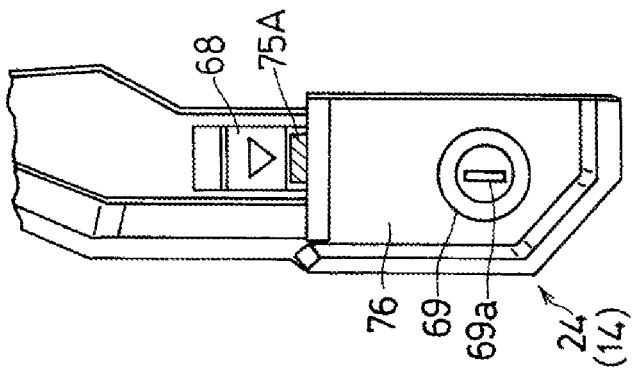
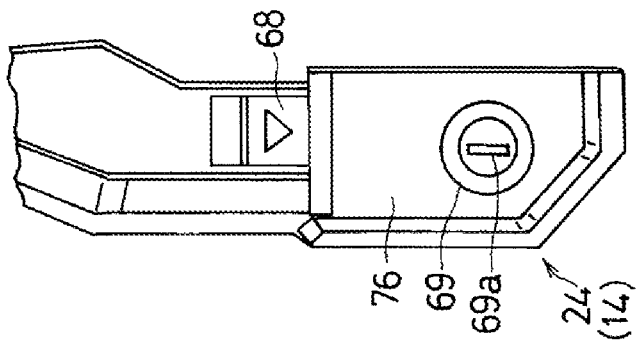

PANNIER AND VEHICLE INCLUDING THE SAME

CROSS REFERENCE TO THE RELATED APPLICATION

This application is based on and claims Convention priority to Japanese patent application No. 2021-009895, filed Jan. 25, 2021, the entire disclosure of which is herein incorporated by reference as a part of this application.

BACKGROUND OF THE INVENTION

Field of the Invention

The present disclosure relates to a pannier for item storage which is attached to a vehicle.

Description of Related Art

Some vehicles such as saddle-riding vehicles have been known in which panniers for item storage are attached to lateral sides at the rear of the vehicles (for example, JP Examined Patent Publication No. S61-043237, International Patent Publication No. WO 2015/140380). A pannier includes a casing body in which an item storage space is defined and a lid member which opens and closes an opening of the casing body.

For antitheft purposes, such a pannier can be locked at an attaching-detaching mechanism which allows the casing body to be attached to and detached from the vehicle body as well as at an opening-closing mechanism which allows the lid member to open and close the casing body. Due to the locking structure in the attaching-detaching mechanism and the opening-closing mechanism, on the other hand, the pannier includes an increased number of components.

SUMMARY OF THE INVENTION

The present disclosure provides a pannier which can have a reduced number of components as well as a saddle-riding vehicle including the same.

The pannier according to the present disclosure is a pannier for item storage to be attached to a vehicle, the pannier including: a casing body which defines a storage space which receives an item and includes an opening through which the item is placed into and taken out from the storage space; a lid which closes the opening of the casing body; an attaching-detaching holder which removably attaches the casing body to the vehicle; an opening-closing holder which attaches the lid to the casing body in an openable and closeable manner; a cylinder which serves to lock both of the attaching-detaching holder and the opening-closing holder; and a movable holder which is movable when the cylinder is unlocked. The cylinder is turned to a lock position, a pannier detaching position and a pannier opening position. When the cylinder is at the lock position, the movable holder is retained by the cylinder at a position where the casing body is unremovable from the vehicle and the lid is unopenable with respect to the casing body. When the cylinder is at the pannier detaching position, the movable holder is movable to an attachable-detachable position where the movable holder allows the casing body to be attached to and detached from the vehicle. When the cylinder is at the pannier opening position, the movable holder is movable to an openable position where the movable holder allows the lid to be opened with respect to the casing body.

According to this constitution, it is possible to lock and unlock the pannier for attachment to and detachment from the vehicle as well as the lid for opening and closing through a turning operation of the single cylinder. Therefore, as compared with a case where the pannier includes separate lock structures for these operations, the pannier includes a reduced number of components and have improved handleability.

The present disclosure encompasses any combination of at least two features disclosed in the claims and/or the specification and/or the drawings. In particular, any combination of two or more of the appended claims should be equally construed as included within the scope of the present disclosure.

BRIEF DESCRIPTION OF THE DRAWINGS

The present disclosure will be more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like or corresponding parts throughout the several views:

FIG. 8A is a plan view showing a position of a second operating member when a holding piece of the pannier is at an unreleasable position;

FIG. 8B is a plan view showing a position of the second operating member when the holding piece is not at the unreleasable position;

FIG. 8C is a plan view showing a different position of the second operating member when the holding piece is not at the unreleasable position;

DESCRIPTION OF THE EMBODIMENTS

Hereinafter, a preferred embodiment of the present disclosure will be described with reference to the drawings.

Figure 1:
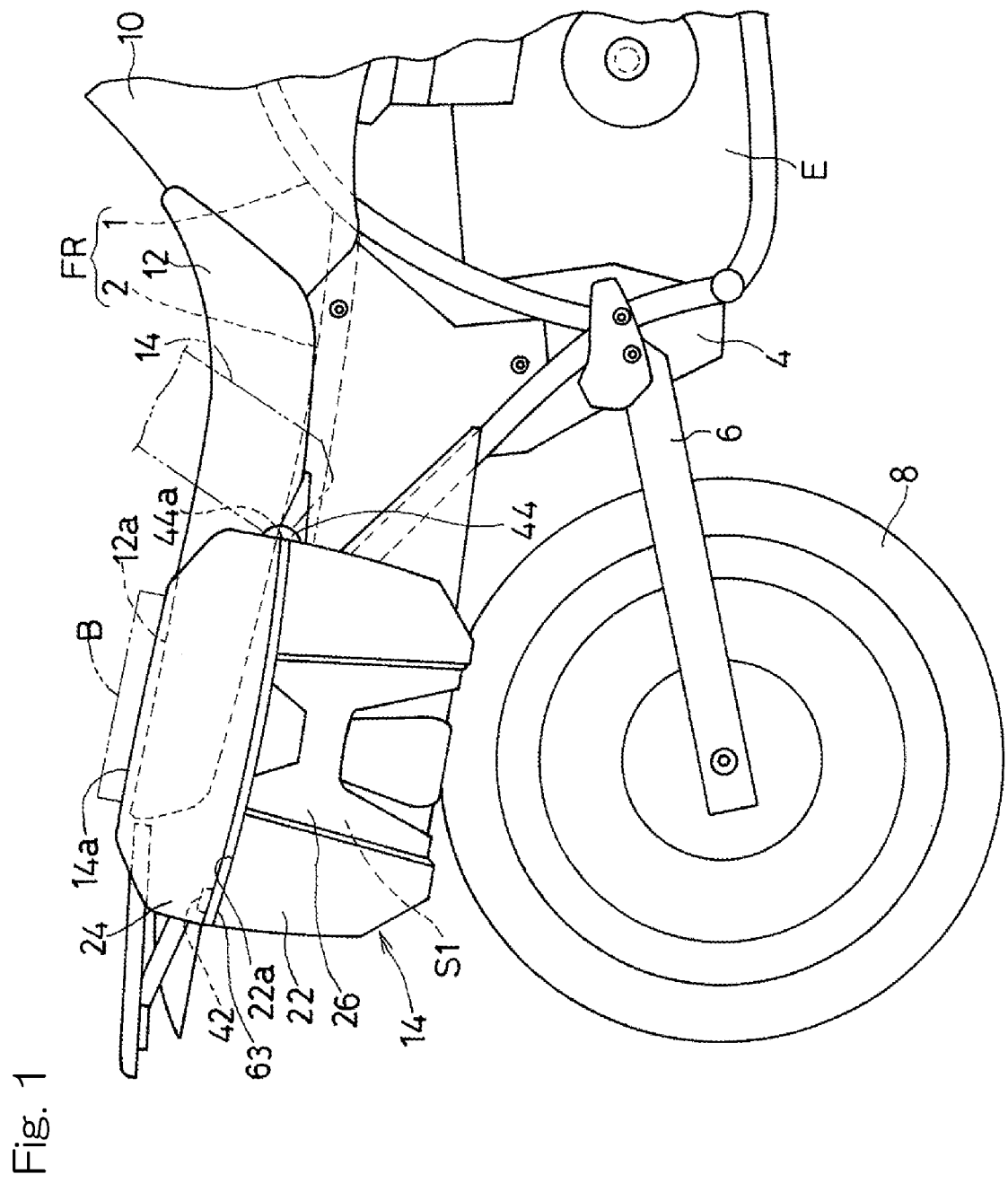
FIG. 1 is a side view showing a rear part of a motorcycle which is a type of vehicle including a pannier according to a first embodiment of the present disclosure.

FIG. 1 is a side view showing a rear part of a motorcycle which is a type of vehicle including a pannier according to a first embodiment of the present disclosure. In the present specification, the "left" and "right" sides correspond to the "left" and "right" sides as viewed by a driver on the vehicle, respectively. The "front" and "rear" correspond to the "front" and "rear" in a direction of movement of the vehicle, respectively. Further, with respect to a vehicle widthwise direction, an inner side in the vehicle widthwise direction refers to a side closer to a center line in the vehicle widthwise direction, the center line extending in a front-rear direction or longitudinal direction of the vehicle, and an outer side in the vehicle widthwise direction refers to a side away from the center line in the vehicle widthwise direction. Unless otherwise noted, a front-rear direction, a widthwise direction, and a vertical direction of the pannier refer to those directions when the pannier is mounted on the vehicle.

The motorcycle according to the present embodiment includes a vehicle body frame FR including a main frame 1 that is a front half of the vehicle body frame FR and a rear frame 2 that is a rear half of the vehicle body frame FR. The main frame 1 extends rearward and diagonally downward from a head pipe (not illustrated) at a front end and then is curved downward to extend in the vertical direction. The head pipe supports a front fork (not illustrated) which supports a front wheel (not illustrated) at a lower end portion of the front fork, and handle bars (not illustrated) is attached to an upper end portion of the front fork.

Figure 2:
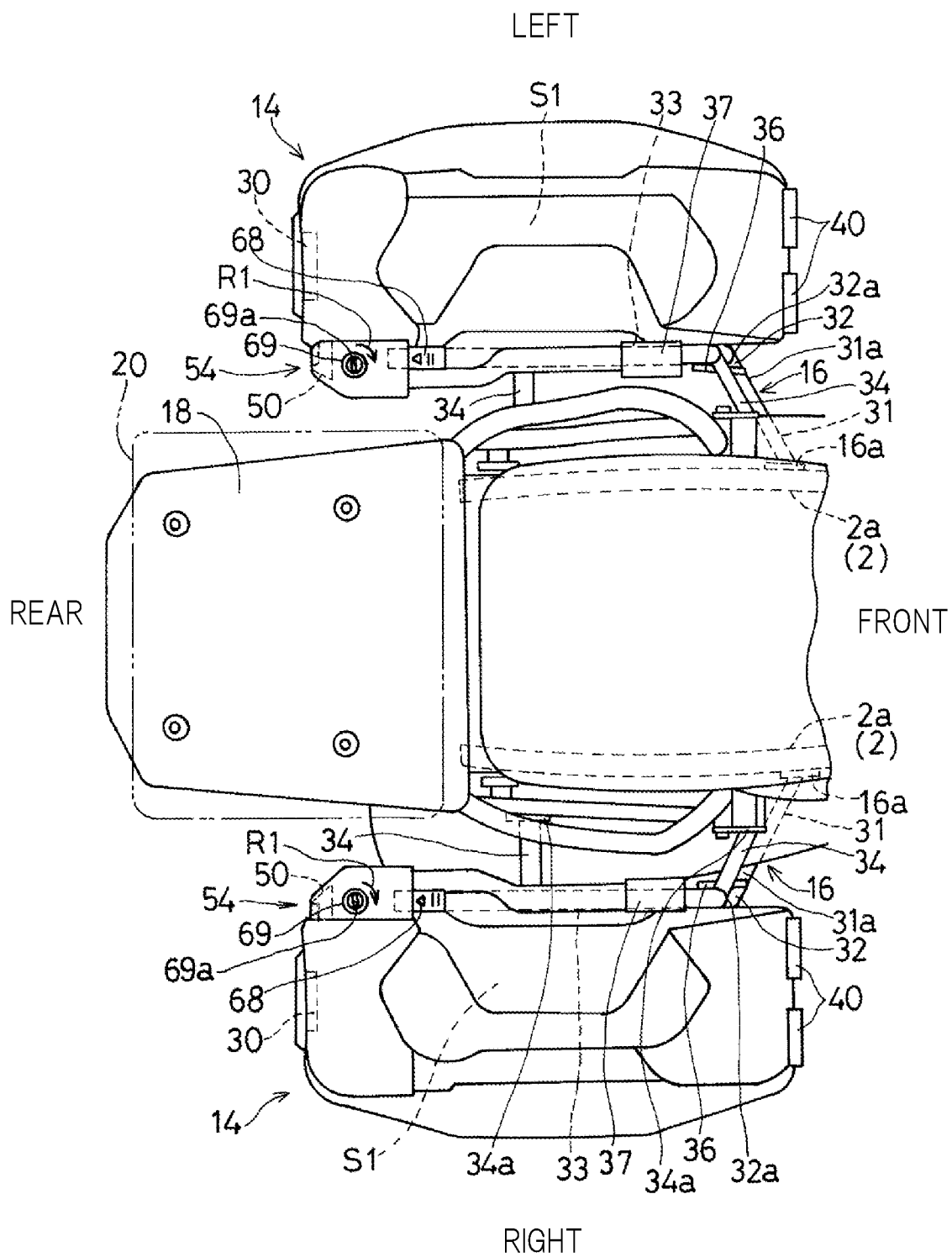
FIG. 2 is a plan view showing the rear part of the motorcycle.

A swingarm bracket 4 is located at a rear end portion of the main frame 1. The swingarm bracket 4 supports a swingarm 6 in such a way that the swingarm can swing in the vertical direction. The swingarm 6 includes a rear end portion to which a rear wheel 8 is attached. The rear frame 2 extends rearward from a rear part of the main frame 1. In the present embodiment, the rear frame 2 includes a pair of left and right portions. Specifically, as shown in FIG. 2, the rear frame 2 includes left and right rear frame pieces 2a, 2a.

An engine E, which is a drive source, is mounted below the main frame 1 and in front of the swingarm bracket 4 as shown in FIG. 1. The engine E drives the rear wheel 8 through a power transmission member (not illustrated) such as a chain. A fuel tank 10 is disposed in an upper part of the main frame 1, and a seat 12 on which a driver sits is attached to the rear frame 2. In the present embodiment, the seat 12 is a double seat including a rider seat part for a driver and a tandem seat part for a passenger. Alternatively, the rider seat and the tandem seat may be separate parts.

A pannier 14 for item storage is attached to a lateral side of the rear part of the vehicle body. As shown in FIG. 2, such panniers 14 are attached to left and right sides of the tandem seat part at a rear part of the seat 12. The pannier 14 has a substantially cuboid shape which is long in the front-rear direction or longitudinal direction of the vehicle body when mounted on the motorcycle. The pannier 14 is supported by the rear frame 2 through a pannier stay 16. The support structure for the pannier 14 will be described later. The pannier stay 16 is removably attached to the rear frame 2 by a fastener (not illustrated) such as a bolt.

The pannier stay 16 is, for example, a steep pipe member and includes a front end portion 16a which is fastened to the rear frame 2. Specifically, the pannier stay 16 includes: a first part 31 extending outward in the vehicle widthwise direction from the front end portion 16a; a second part 32 extending diagonally upward to the rear from an outer end 31a of the first part 31; and a third part 33 extending rearward from an upper end 32a of the second part 32. To an upper portion of the second part 32 and a rear portion of the third part 33, support members 34 extending inward in the vehicle widthwise direction are connected at their outer end portions in the vehicle widthwise direction, which are one end portions of the support members. The support members 34 are fastened to the rear frame 2 at their inner end portions 34a in the vehicle widthwise direction, which are the other end portions of the support members.

A carriage plate 18 is located in the rear of the seat 12 and is supported by the rear frame 2. For example, the carriage plate 18 may be used for carrying luggage. A top casing 20 for item storage can be attached to the carriage plate 18. The top casing 20 is disposed between the left and right panniers 14, 14.

As shown in FIG. 1, each pannier 14 has a flat upper face 14a which is located higher than an upper face 12a of the seat 12 when the pannier is mounted on the vehicle. Thus, a long item B can be placed in the vehicle widthwise direction on upper faces of the left and right panniers 14, 14.

Each pannier 14 is shaped as a resin box and includes a casing body 22 and a lid 24 or lid member 24. Inside the casing body 22, a storage space S1 is defined for item storage. The casing body 22 includes, at an upper end thereof, an opening 22a through which an item is placed into or taken out from the storage space S1.

A protection member 26 is removably attached to an outer lateral face of the casing body 22 in the vehicle widthwise direction. The protection member 26 is removably attached to the casing body 22 by means of a fastener (not illustrated) such as a bolt. The attachment structure of the protection member 26 is not limited to this type. The protection member 26 on the outer lateral face of the casing body 22 can protect a part of the casing body 22 which is prone to damage. Thus, even when the pannier 14 gets a scratch, it is only necessary to replace the protection member 26, instead of the whole pannier 14.

Figure 3:
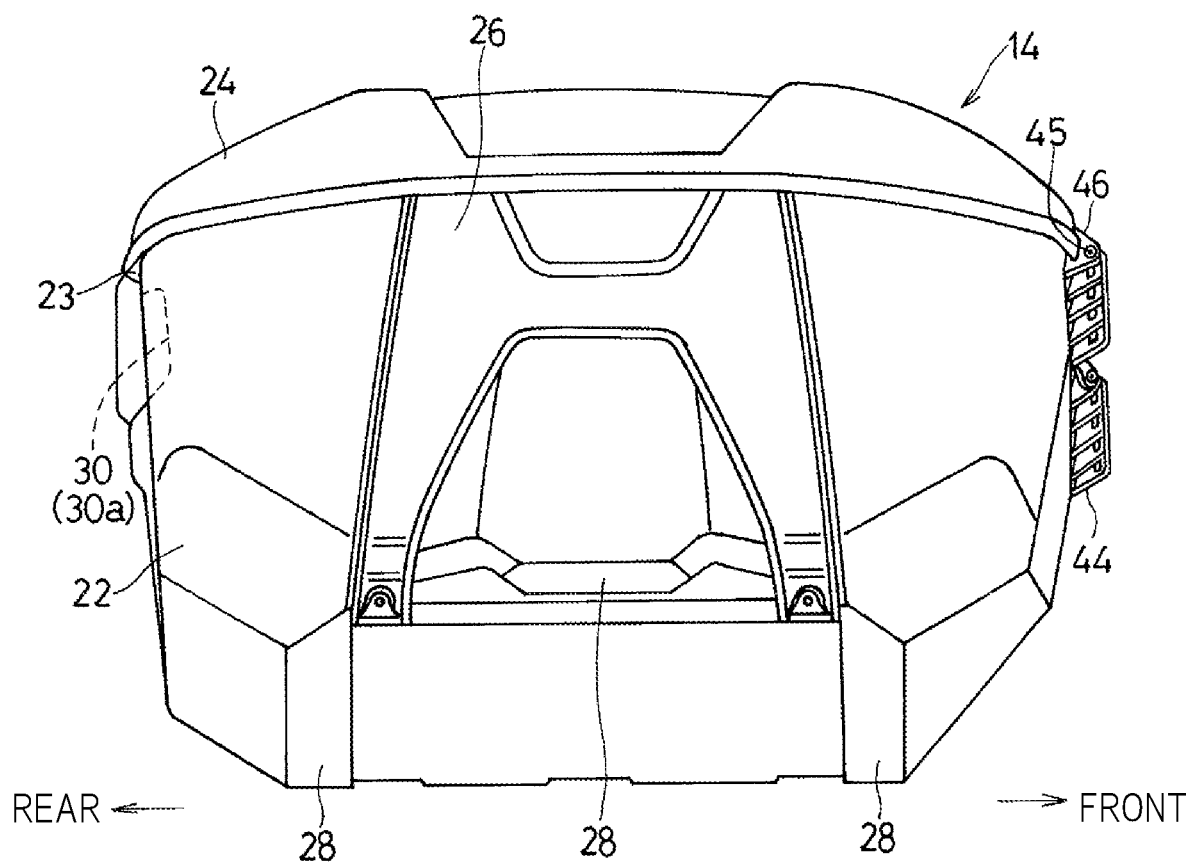
FIG. 3 is a perspective view of the pannier as viewed from diagonally below.

As shown in FIG. 3, the casing body 22 includes legs 28 for self-support on the bottom face thereof. The legs 28 protrude downward from the bottom face of the casing body 22. In the present embodiment, the legs 28 are integrated with the casing body 22. The legs 28 are located at three positions, namely, at a front end portion, a rear end portion and an outer end portion in the vehicle widthwise direction on the bottom face of the casing body 22. The number and positions of the legs 28 are not limited to those of the present embodiment. Thanks to the legs 28 on the bottom face of the casing body 22, the pannier 14 can stand on its own on the ground, so that it is easy to handle.

The casing body 22 includes a casing-side handle 30 on a rear face thereof. The handle 30 is located at an upper part of the rear face of the casing body 22 and includes an opening 30a which opens downward. In other words, the handle 30 is arranged at the upper part of the rear face of casing body 22 and is shaped like a pocket which opens downward. When the pannier 14 is detached from the vehicle, a user may insert fingers into the opening 30a of the handle 30 to hold the handle 30 with the fingers and lift up the pannier 14, so that the pannier 14 can be carried.

When the pannier 14 is supported on the vehicle with a second holding member or movable holder (which will be described later) released so as not to effect holding, the user may hold the handle 30 with the fingers to lift up the pannier 14 and detach it from the vehicle. Thus, the handle 30 may be used when the pannier 14 is carried and when the pannier 14 is detached from the vehicle body. In this way, the structure can be simplified in that a same part can serve for both transport and detachment of the pannier 14.

Figure 4:
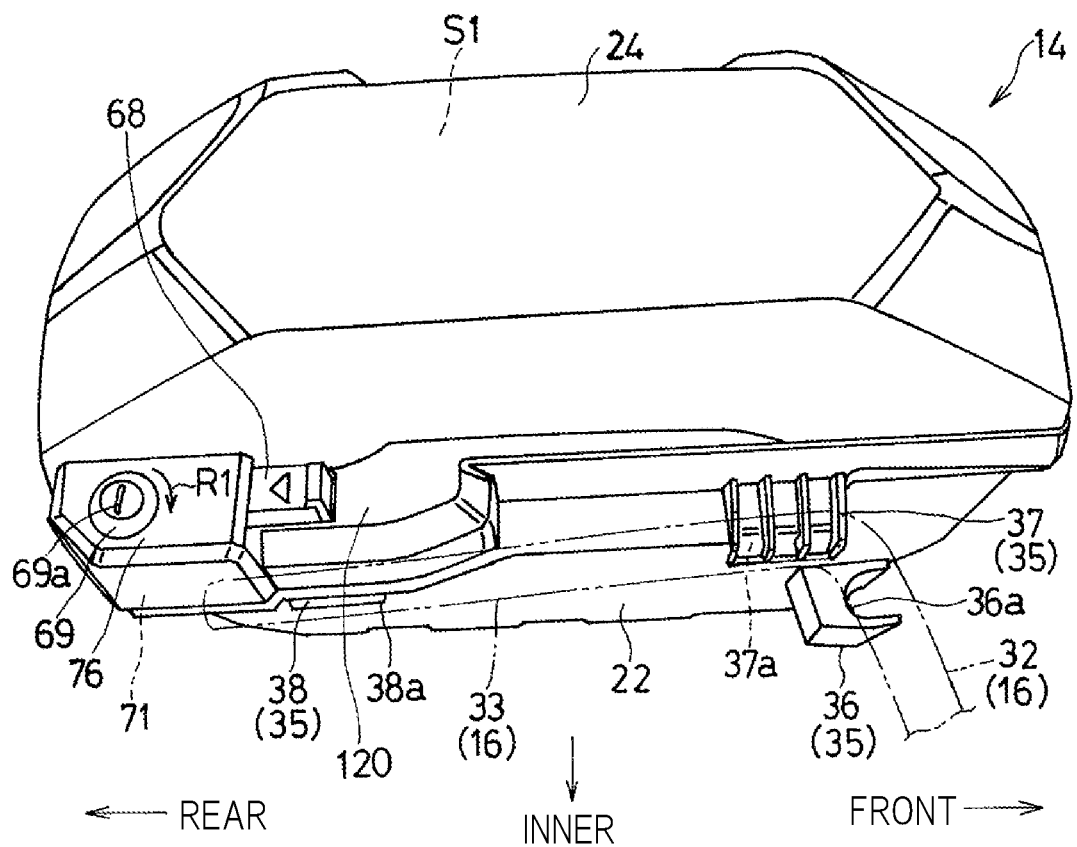
FIG. 4 is a perspective view of the pannier as viewed from an inner side in a vehicle widthwise direction.

As shown in FIG. 4, the casing body 22 includes, on an inner lateral face thereof in the vehicle widthwise direction, a to-be-supported body 35 to be supported by the vehicle body. In the present embodiment, there are three to-be-supported bodies 35, namely, first to third to-be-supported bodies 36, 37, 38.

The first to-be-supported body 36 is located at a lower position of a front end portion of the inner lateral face of the casing body 22. The second and third to-be-supported bodies 37, 38 are located at an upper end portion of the inner lateral face of the casing body 22 and are arranged in line in the front-rear direction, with the second to-be-supported body 37 located at a forward position. Thus, the to-be-supported bodies 36, 37, 38 are arranged at two separate positions in the front-rear direction and at two separate positions in the vertical direction. The number and positions of the to-be-supported bodies 36 to 38 are not limited to those of the present embodiment.

In the present embodiment, the first to third to-be-supported bodies 36, 37, 38 are integrally formed with the casing body 22 by molding. The first to-be-supported body 36 protrudes inward in the vehicle widthwise direction from the inner lateral face of the casing body 22 and includes a first recess part 36a which opens forward. The second and third to-be-supported bodies 37, 38 protrude inward in the vehicle widthwise direction from the inner lateral face of the casing body 22 and include second and third recess parts 37a, 38a, respectively, which open downward. The second recess part 37a and the third recess part 38a are located at an interval in the front-rear direction.

The pannier stay 16 includes a front-rear part extending in the front-rear direction and a bent part extending downward from a front end portion of the front-rear part. The pannier 14 is brought closer to the pannier stay 16 from above, and the second recess part 37a and the second recess part 38a are fitted to a front part and a rear part of the pannier stay 16, respectively. Thus, the pannier 14 is supported by pannier stay 16 from below. Then, the pannier 14 is moved forward from the rear of the bent part of the pannier stay 16, such that the first recess part 36a is fitted to the bent part of the pannier stay 16. Thus, the pannier 14 is restricted by the pannier stay 16, so that the pannier 14 is prevented from moving forward.

The lid 24 as shown in FIG. 1 closes an opening 22a of the casing body 22. Hereinafter, the expression "the lid closes" or the like may sometimes be used to describe a state where the lid 24 closes the opening 22a of the casing body 22. Also, the expression "the lid opens" or the like may sometimes be used to describe a state where the lid 24 opens the opening 22a of the casing body 22. The lid 24 includes an opening-closing holder or an opening-closing mechanism which attaches the lid to the casing body 22 in an openable and closeable manner. The opening-closing holder includes a hinge 40 and an opening prevention part 42. The hinge 40 is located at a front part of the pannier 14. Specifically, the hinge 40 connects an upper front end portion of the casing body 22 to a lower front end portion of the lid 24 and has a hinge axis line extending in the left-right direction or vehicle widthwise direction at the connection part. The hinge 40 is connected such that a part of the hinge which is located on the side of the lid 24 can be angularly displaced about the hinge axis line with respect to another part of the hinge which is located on the side of the casing body 22. Thus, the lid 24 is attached to the casing body 22 through the hinge 40 so as to be openable and closeable.

The opening prevention part 42 is located at a rear part of the pannier 14. The opening prevention part 42 includes a casing-side section located on the side of the casing body 22 and a lid-side section located on the side of the lid 24. When the casing-side section and the lid-side section of the opening prevention part 42 are engaged with each other with the lid 24 closing the casing body 22, this engagement prevents angular displacement of the lid 24 with respect to the casing body 22, so that the casing body 22 is prevented from opening. When the engagement between the casing-side section and the lid-side section of the opening prevention part 42 is released, the lid 24 is allowed to be angularly displaced with respect to the casing body 22, so that the casing body 22 can be opened. Thus, the lid 24 can be switched between a unopenable-unclosable state and an openable-closable state by the opening prevention part 42. The opening prevention part 42 will be described in detail later.

As shown in FIG. 3, the hinge 40 includes: a first hinge member 44 which is attached to the casing body 22; a second hinge member 46 which is attached to the lid 24; and a hinge shaft 45 which couples the hinge members 44, 46 in a turnable manner. The hinge shaft 45 extends in the vehicle widthwise direction. To open the casing body 22, the lid 24 is angularly displaced about the hinge shaft from a state where the lid 24 closes the casing body 22, such that a rear end portion of the lid 24 is moved forward. Accordingly, the lid 24 is constructed to be opened from the rear to the front. This can prevent the lid 24 from opening due to wind during traveling.

As indicated with a double dotted line in FIG. 1, an upper face 44a of the first hinge member 44 on the side of the casing body 22 is inclined upward to the front. When the lid 24 is opened, a front face of the lid 24 comes into contact with the upper face 44a of the first hinge member 44. Thus, the lid 24 can be held at a predetermined position, so that the lid 24 can be prevented from opening excessively.

The lid 24 includes a tab part 23 (FIG. 3) on a rear face thereof. The tab part 23 is located at a lower part of the rear face of the lid 24 and includes an opening which opens downward. In other words, the tab part 23 is arranged at the lower part of the rear face of the lid 24 and is shaped like a pocket which opens downward. With a first holding member or first movable holder (which will be described later) released so as not to effect holding, a user may insert fingers into the opening of the tab part 23 to hold the tab part 23 with the fingers and raise the lid 24, so that the lid 24 can be more easily displaced angularly. In the present embodiment, the tab part 23 of the lid 24 is located above the handle 30 of the casing body 22 and adjacent to the handle 30.

Figure 5:
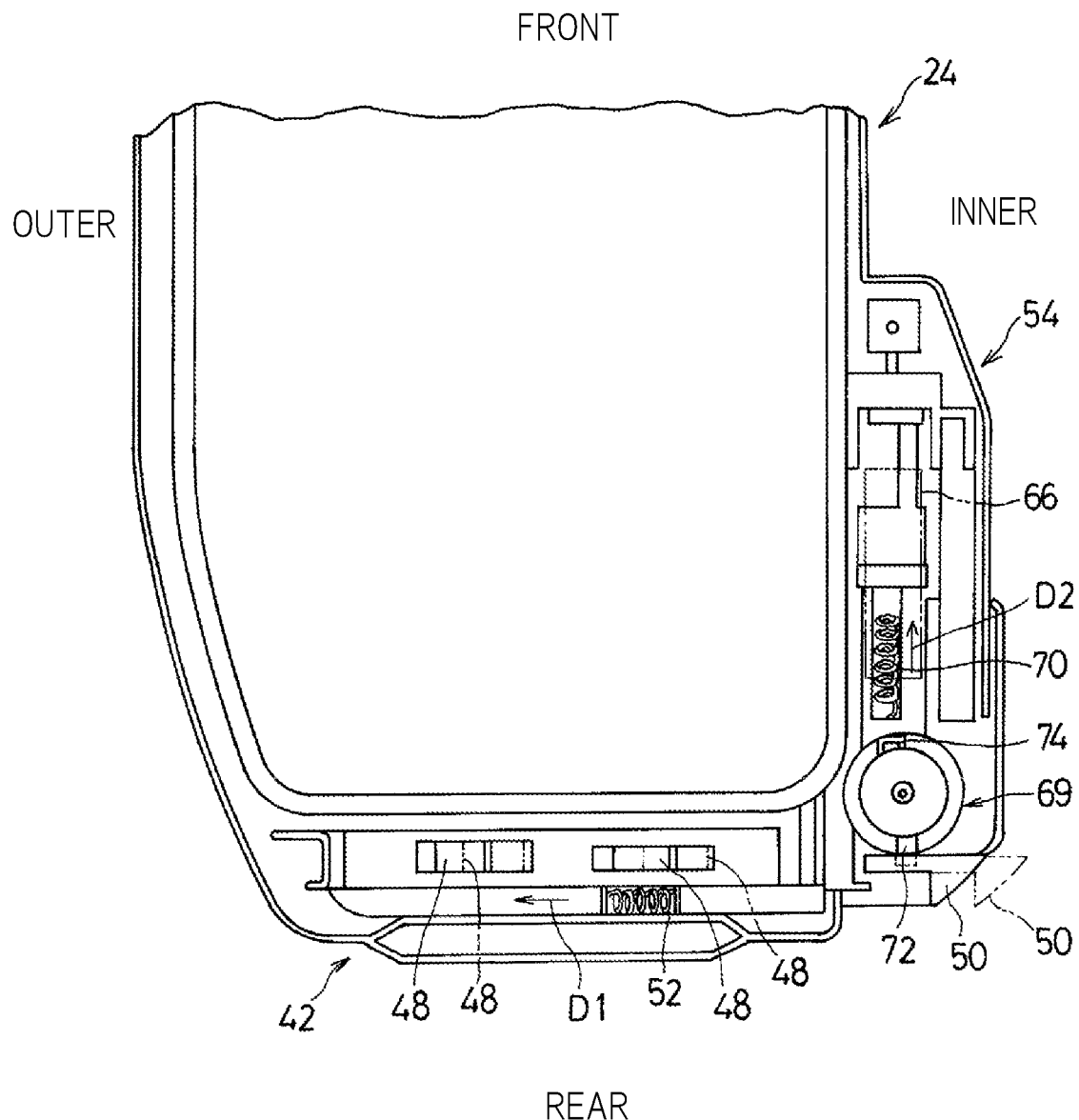
FIG. 5 is an internal view of a lid of the pannier as viewed from an interior of the pannier.

As shown in FIG. 5, the lid-side section of the opening prevention part 42 is located at the rear end portion of the lid 24. The casing-side section of the opening prevention part 42 is located opposite to the lid-side section and at an upper rear end portion of the casing body 22. When the lid-side section of the opening prevention part 42 is held with respect to the casing-side section of the opening prevention part, the lid 24 is prevented from opening the casing body 22.

Figure 9A:
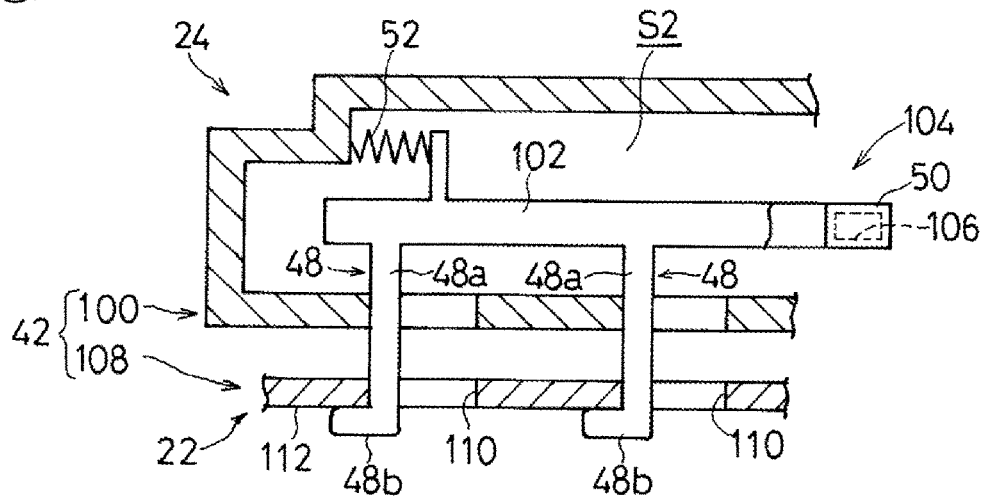
FIG. 9A is a cross-sectional view of an opening prevention part when the pannier is closed.
Figure 9B:
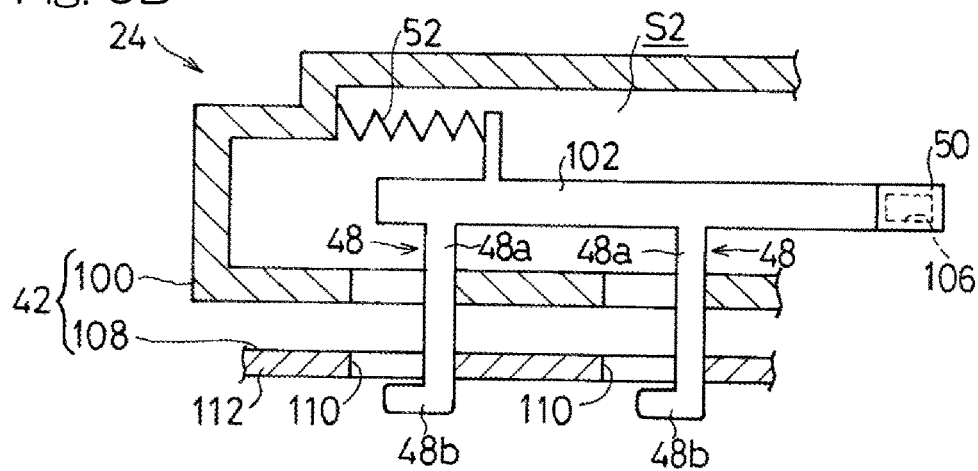
FIG. 9B is a cross-sectional view of the opening prevention part when the pannier is openable.
Figure 9C:
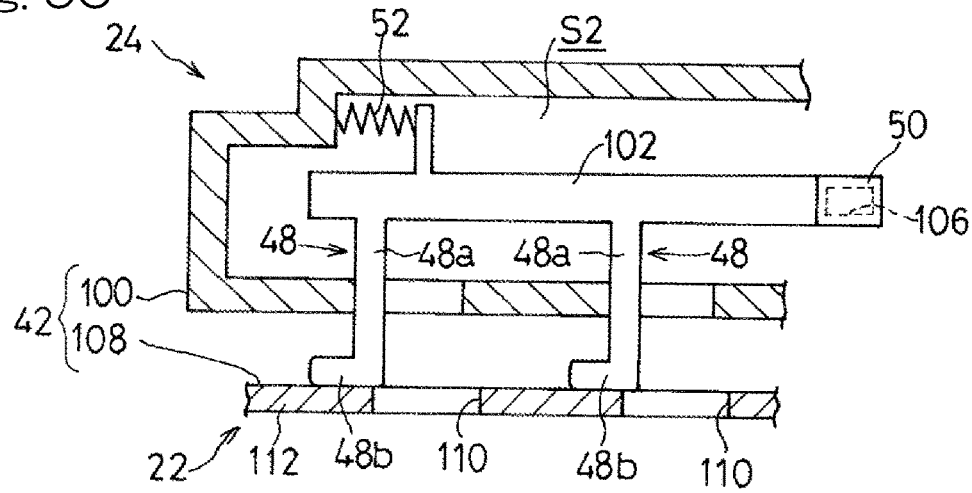
FIG. 9C is a cross-sectional view of the opening prevention part when the pannier cannot be closed.

As shown in FIG. 9A to FIG. 9C, in the present embodiment, the lid-side section 100 of the opening prevention part 42 includes first holding pieces 48, a coupling piece 102, a first operating piece 50, and a first spring body 52. In the present embodiment, there are two such first holding pieces 48 or first holding elements 48 arranged in the vehicle widthwise direction. The coupling piece 102 couples the respective first holding pieces 48 to the first operating piece 50 and extends in the vehicle widthwise direction. Therefore, the first holding pieces 48, the coupling piece 102 and the first operating piece 50 are realized as a single first movable holder 104. Accordingly, the first holding pieces 48 are displaced in conjunction with a displacing operation of the first operating piece 50.

The first movable holder 104 is housed in a first guide space S2 defined in the lid 24 and is guided in a displaceable manner in the vehicle widthwise direction within a predefined allowable range. In other words, the first movable holder 104 is housed in the first guide space S2 of the lid 24, so that the first movable holder 104 is prevented from being displaced in other directions than the vehicle widthwise direction.

When an operator displaces the first operating piece 50 in the vehicle widthwise direction, the first holding pieces 48 coupled to the first operating piece 50 are moved in the vehicle widthwise direction. The first operating piece 50 is arranged at a position where it is exposed on a rear face of the lid 24. In the present embodiment, the first operating piece 50 is located adjacent to a cylinder 69 which will be described later, and is exposed at a portion which is located on the side of the vehicle body on the rear face of the lid 24 and at a side face of the lid 24 which is located on the side of the vehicle body. The first operating piece 50 has a hook shape and includes a recess 106 which can receive a finger approaching from the rear. In an unlocked state as described later, the finger inserted into the recess 106 of the first operating piece 50 may apply a force acting inward in the vehicle widthwise direction to a body-side inner surface of the recess 106 so as to move the first holding pieces 48 inward in the vehicle widthwise direction in conjunction with the first operating piece 50.

The first movable holder 104 is urged outward in the vehicle widthwise direction by an urging force applied to the lid 24 by the first spring body 52. In the present embodiment, the first spring body 52 which is realized as a coil spring is arranged in the first guide space S2 defined in the lid 24 and is supported such that opposite end portions of the first spring body 52 are connected to the lid 24 and the first movable holder 104. The first movable holder 104 is pressed outward in the vehicle widthwise direction by the first spring body 52 so as to be positioned at a predefined lid holding position. While the force is applied to displace the operating piece 50 inward in the vehicle widthwise direction against the first spring body 52, the first movable holder 104 is displaced to a lid releasing position which is located inward in the vehicle widthwise direction with respect to the lid holding position. When the force no longer acts on the first operating piece 50, the first movable holder 104 is returned to the lid holding position by the first spring body 52.

Each of the first holding pieces 48 is a holding hook which protrudes downward from a bottom face of the lid 24. Each first holding piece 48 has an L shape and includes a protruding part 48a extending downward from the coupling piece 102 and a hook part 48b extending in the vehicle widthwise direction from a lower end portion of the protruding part 48a. The casing-side section 108 of the opening prevention part 42 includes a holding wall 112 in which openings 110 are defined. Each opening 110 of the holding wall 112 has a larger dimension in the vehicle widthwise direction than that of the hook part 48b.

When the lid 24 closes the casing body 22 (FIG. 9A), the protruding parts 48a of the first holding pieces 48 of the first movable holder 104 extend through the openings 110 of the holding wall 112, and the hook parts 48b are located below the holding wall 112. When the first movable holder 104 is located at the lid holding position, the hook parts 48b are located so as to face a lower surface of the holding wall 112. Thus, even if an attempt is made to move the rear end of the lid 24 upward with respect to the casing body 22, the hook parts 48b are caught on the holding wall 112 to prevent the movement of the lid 24, so that the casing body 22 is prevented from opening.

As described above, in conjunction with an operation of the first operating piece 50, the first movable holder 104 can be moved inward in the vehicle widthwise direction against the urging force of the first spring body 52 (FIG. 9B). In this way, the first movable holder 104 can be moved from the lid holding position to the lid releasing position. When the first movable holder 104 is moved to the lid releasing position, the hook parts 48b are retracted away from the lower surface of the holding wall 112 to come into opening areas.

In this state, the hook parts 48b are no longer held on the holding wall 112. In this state, the hook parts 48b can pass through the openings 110 of the holding wall 112 to move upward, without being held on the holding wall 112. Accordingly, the first operating piece 50 can be operated with one hand, and the tab part can be operated with the other hand to move the rear end of the lid 24 upward with respect to the casing body 22. In this way, the lid 24 is put into the openable-closable state.

With the lid 24 released from the casing body 22 and with the lid 24 opened, once the operator leaves the one hand operating the first operating piece 50, the first movable holder 104 is moved outward in the vehicle widthwise direction due to the urging force of the first spring body 52 to return to the lid holding position (FIG. 9C). In this state, if the rear end portion of the lid 24 is moved downward in order to close the lid 24, the hook parts 48b of the first movable holder 104 hit an upper surface of the holding wall 112. In this case, when the hook parts 48b come into contact with the upper surface of the holding wall 112, the downward movement of the lid 24 is prevented, so that the lid 24 is prevented from closing the casing body 22.

In this case, both hands have to be used to close the casing body 22, as with the opening operation of the casing body 22. Specifically, in conjunction with an operation of the first operating piece 50 with one hand, the first movable holder 104 can be moved inward in the vehicle widthwise direction against the urging force of the first spring body 52. In this way, the first movable holder 104 can be moved from the lid holding position to the lid releasing position. When the first movable holder 104 is moved to the lid releasing position, the hook parts 48b are retracted away from the lower surface of the holding wall 112 to come into the opening areas.

In this state, the hook parts 48b are no longer held on the holding wall 112. In this state, the hook parts 48b can pass through the openings 110 of the holding wall 112 to move downward, without being held on the holding wall 112. Accordingly, the first operating piece 50 can be operated with one hand, and the tab part can be operated with the other hand to move the rear end of the lid 24 downward with respect to the casing body 22.

The casing body 22 (FIG. 1) is removably attached to the vehicle body through an attaching-detaching holder 54 or attaching-detaching mechanism 54. That is, the casing body 22 can be switched between a unremovable state and a removable state through the attaching-detaching holder 54. The attaching-detaching holder 54 is located at an inner part of the pannier 14 in the vehicle widthwise direction.

Before describing the attaching-detaching holder 54, a support structure of the pannier 14 will be described. As shown in FIG. 4, the second part 32 of the pannier stay 16 supports the first to-be-supported body 36 of the pannier 14, and the third part 33 of the pannier stay 16 supports the second and third to-be-supported bodies 37, 38 of the pannier 14. Specifically, the second part 32 of the pannier stay 16 is fitted into the first recess part 36a of the first to-be-supported body 36 of the pannier 14 from the front, and the third part 33 of the pannier stay 16 is fitted into the second and third recess parts 37a, 38a of the second and third to-be-supported bodies 37, 38 of the pannier 14 from below.

Figure 6A:
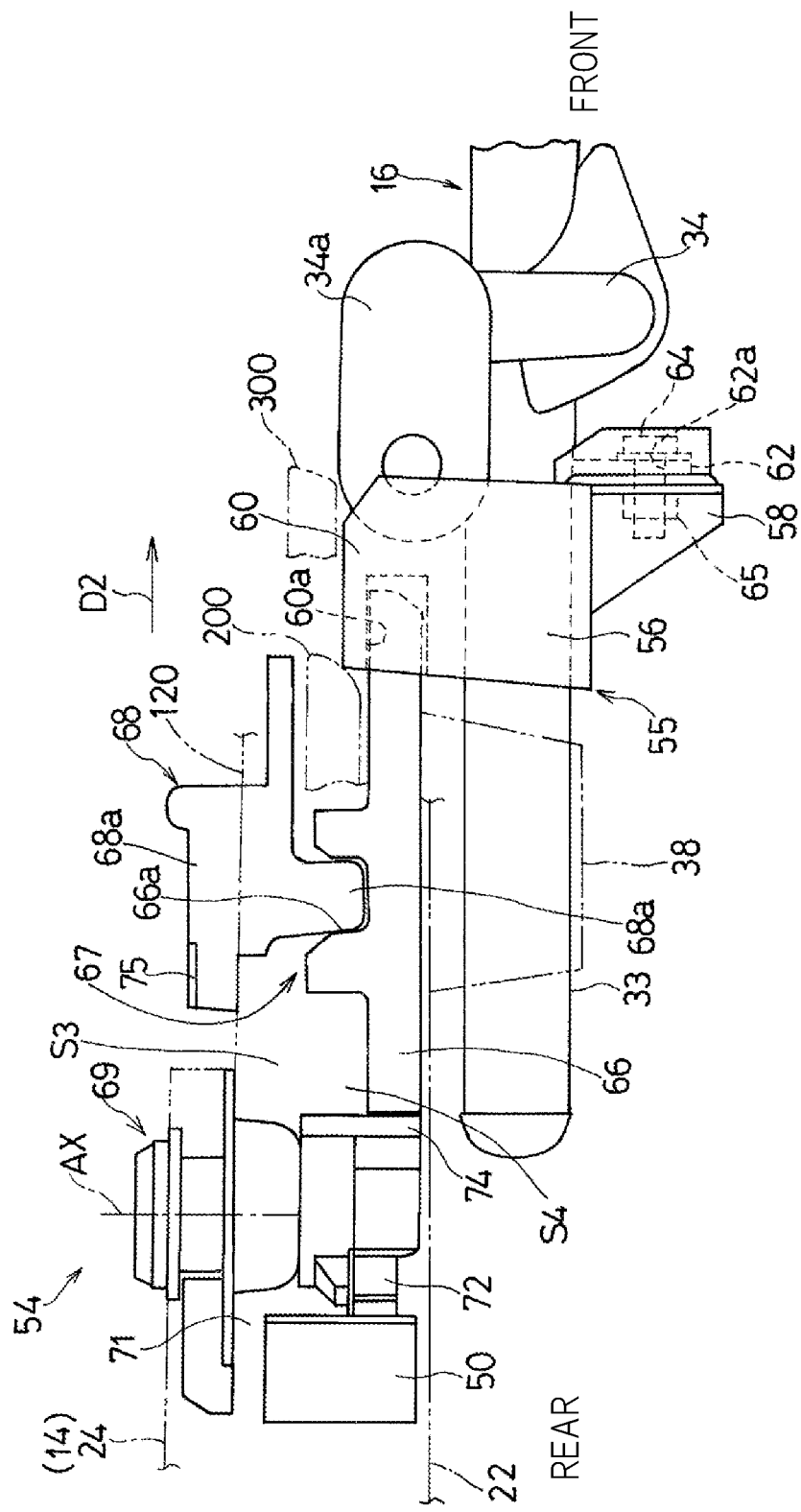
FIG. 6A is a side view of an attaching-detaching holder of the pannier in a locked state.

As shown in FIG. 6A, a holder 55 is fixed to the pannier stay 16. The holder 55 serves as a fixing part for preventing detachment of the pannier 14 from the pannier stay 16. The holder 55 is fixed to the pannier stay 16 at a position adjacent to the third part 33 of the pannier stay 16. In the present embodiment, the holder 55 is located close to a part of the pannier 14 where the third to-be-supported body 38 is fitted. Specifically, the holder 55 is located between the third part 33 and the connection of one of the support members 34 to the pannier stay 16. In the present embodiment, the holder 55 is bolted to a fixing part on the pannier stay 16. With the pannier 14 supported on the stay 16, the holder 55 is located so as to face, from the front, a second holding member or second movable holder which will be described later.

Figure 7:
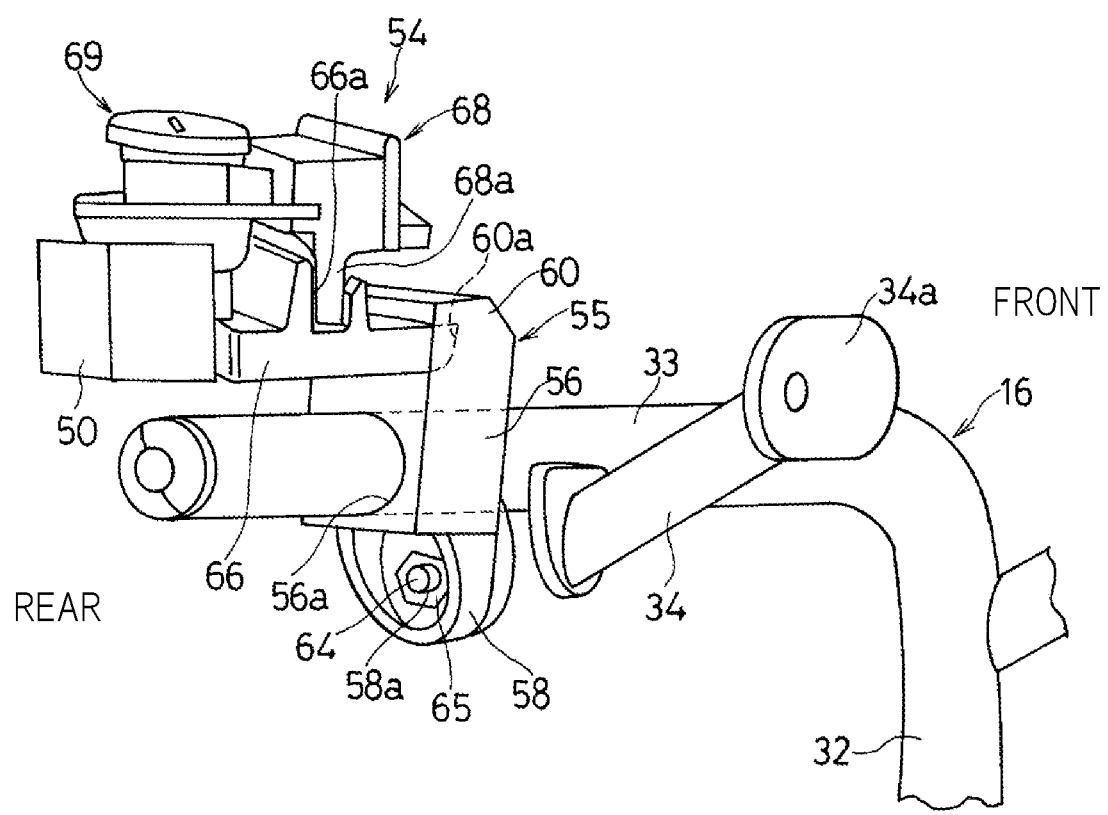
FIG. 7 is a perspective view of the attaching-detaching holder of the pannier.

As shown in FIG. 7, the holder 55 includes: a pipe insertion part 56 through which the pannier stay 16 is inserted; a supporting part 58 which projects downward from the pipe insertion part 56; and a holding part 60 which projects upward from the pipe insertion part 56. The pipe insertion part 56 includes an insertion hole 56a through which the pannier stay 16 is inserted. The holding part 60 also includes a holding hole 60a which opens rearward. The later-described second holding piece 66 of the attaching-detaching holder 54 can be inserted into the holding hole 60a.

The holder 55 serves to prevent attachment and detachment of the pannier 14 when the second holding piece 66 is inserted into the holder 55. The holding part of the holder 55 is located above the pannier stay 16. In other words, with the pannier 14 supported thereon, the holding part of the holder 55 is located above a support plane which is defined in the casing body 22. The casing body 22 includes a fitting recess which receives the above-described holder 55 attached to the pannier stay 16. The fitting recess is a recess which opens downward. The supporting part 58 includes a bolt insertion hole 58a facing the front-rear direction (i.e., the direction of extension of the third part 33). As shown in FIG. 6A, on the other hand, an attaching piece 62 which protrudes downward is located on the third part 33 of the pannier stay 16, and the attaching piece 62 includes a bolt insertion hole 62a facing the front-rear direction. With the third part 33 of the pannier stay 16 inserted through the pipe insertion part 56, a fastener 64 such as a bolt is sequentially inserted, from a rear side of the vehicle body, into the bolt insertion hole 62a of the attaching piece 62 and the bolt insertion hole 58a of the supporting part 58 and is fastened with a nut 65. Thus, the holder 55 is fixed at a predetermined position on the pannier stay 16.

Figure 6B:
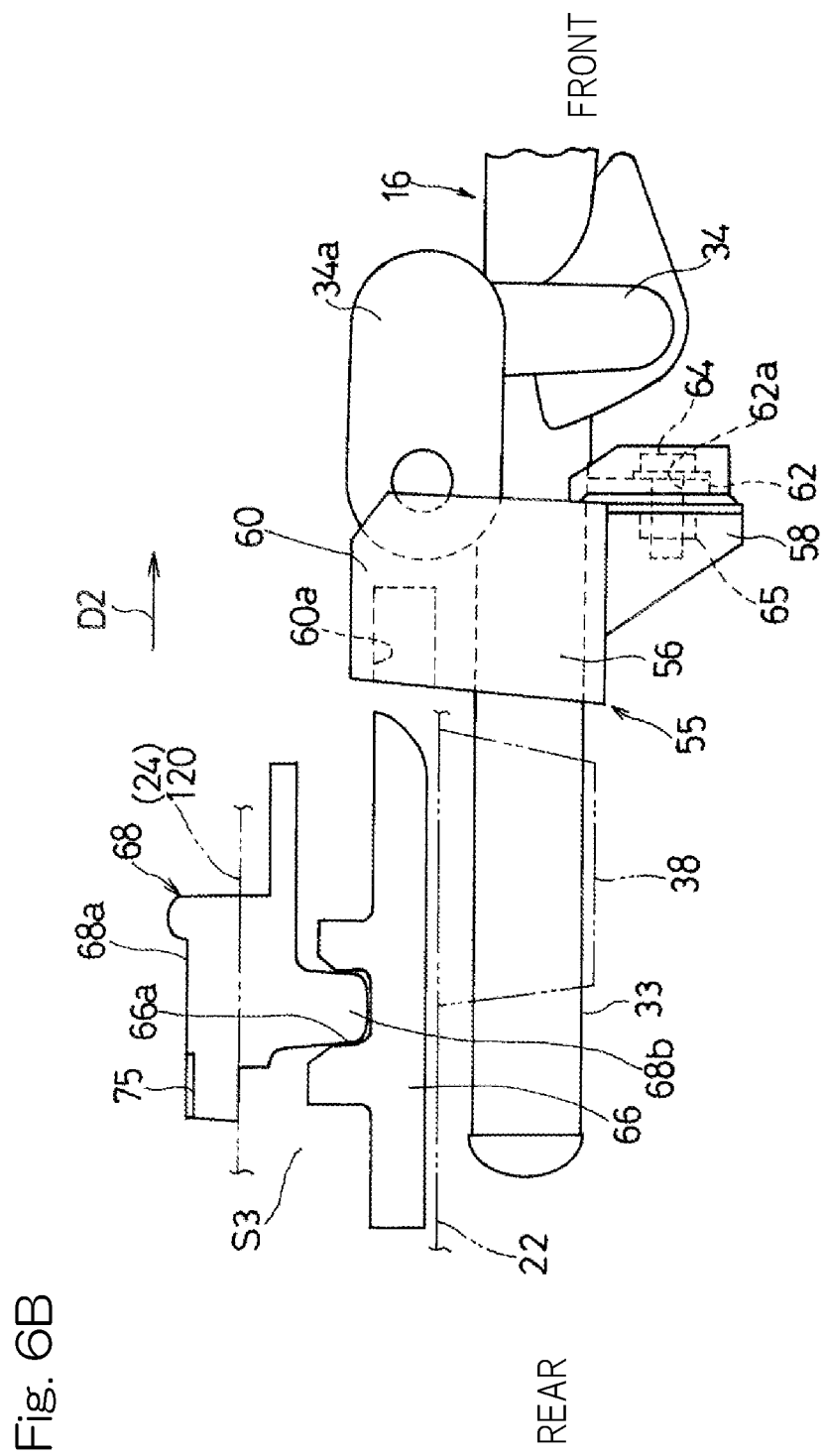
FIG. 6B is a side view of the attaching-detaching holder of the pannier in an unlocked state.

The attaching-detaching holder 54 is located at the inner part of the casing body 22 in the vehicle widthwise direction as described above. Specifically, the attaching-detaching holder 54 is located at an area between the storage space S1 and an exterior member of the vehicle such as the rear frame 2 in a plan view of FIG. 2. Each of the casing body 22 and the lid 24 includes a defining wall which defines the storage space S1 and a brim part which protrudes inward in the vehicle widthwise direction with respect to the defining wall. The attaching-detaching holder 54 is located in these brim parts. As shown in FIG. 6A and FIG. 6B, the attaching-detaching holder 54 includes the second holding piece 66 or a second holding member or second movable holder 66, a second operating member 68, and a second spring body 70 (FIG. 5).

The second operating member 68 is a rectangular slider which is partially exposed on an upper face of the lid 24. The second operating member 68 can be freely moved in the front-rear direction when an operator pinches and slides the second operating member. Specifically, the second operating member 68 is supported by the lid-side brim part 120 (FIG. 4) which protrudes inward in the vehicle widthwise direction with respect to the defining wall which defines the storage space S1 in the lid 24.

The second operating member 68 is housed in a second guide space S3 defined in the lid-side brim part 120 and is guided in a displaceable manner in the front-rear direction within a predefined allowable range. In other words, the second operating member 68 is housed in the second guide space S3 of the lid 24, so that the second operating member is prevented from being displaced in other directions than the front-rear direction. The second operating member 68 includes an operating piece 68a which is exposed above the lid-side brim part 120, and a protruding piece 68b which is connected to the operating piece 68a and protrudes downward from the lid-side brim part 120.

The second movable holder 66 is located below the second operating member 68. Specifically, the second movable holder 66 is supported by the body-side brim part 63 (FIG. 1) which protrudes inward in the vehicle widthwise direction with respect to the defining wall which defines the storage space S1 in the casing body 22. The second movable holder 66 is housed in a third guide space S4 defined in the body-side brim part 63 and is guided in a displaceable manner in the front-rear direction within a predefined allowable range. In other words, the second movable holder 66 is housed in the third guide space S4 of the casing body 22, so that the second movable holder is prevented from being displaced in other directions than the front-rear direction. When the casing body 22 is attached to the pannier stay 16, the third guide space S4 is located adjacent to the holder 55. That is, the fitting recess (not illustrated) which receives the holder 55 is located in the casing-side brim part 63 of the casing body 22.

The casing-side brim part 63 includes a communication hole (not illustrated) which communicates the third guide space S4 with the fitting recess in the front-rear direction. The casing body 22 includes a wall facing the holder 55 from the rear when the holder 55 is fitted into the fitting recess. Thus, when the holder 55 is fitted into the fitting recess, the casing body 22 is prevented from moving forward with respect to the pannier stay 16.

The second movable holder 66 includes a groove part 67 which is exposed above the body-side brim part 63. The groove part 67 includes an engagement groove 66a which can be engaged with the protruding piece 68b of the second operating member 68. Specifically, the groove part 67 includes a front side surface which faces the engagement groove 66a on the front side and a rear side surface which faces the engagement groove 66a on the rear side. The dimension between the front side surface and the rear side surface in the front-rear direction is slightly larger than the dimension of the protruding piece 68b in the front-rear direction. At least one of the front side surface and the rear side surface includes, at an upper part thereof, an inclined surface which is inclined away from the engagement groove 66a in the front-rear direction as it extends upward.

When the lid 24 is closed (FIG. 6A), the protruding piece 68b of the second operating member 68 is located at a position where the protruding piece 68b is engaged with the engagement groove 66a of the second movable holder 66. The engaged second movable holder 66 moves in the front-rear direction in conjunction with the second operating member 68. The second movable holder 66 and the second operating member 68 may be integrated with each other. Alternatively, the second operating member 68 may include a groove on a lower face thereof, and the second movable holder 66 may include an engagement protrusion on an upper face thereof.

The second movable holder 66 includes a front end portion which is connected to the groove part and extends frontward from the groove part and a rear end portion which extends rearward from the groove part. The front end portion of the second movable holder 66 penetrates through the communication hole so as to be able to move into and out of the fitting recess. When the pannier 14 is attached to the pannier stay 16, the front end portion of the second movable holder 66 is fitted into the holding hole 60a of the holder 55. The holder 55 faces at least the front end portion of the second movable holder 66 from above. Thus, the casing body 22 is held by the holder 55, so that the casing body 22 is prevented from moving upward with respect to the pannier stay 16.

At least one of the second operating member 68 and the second movable holder 66 receives a frontward urging force given by the second spring body 70. In the present embodiment, the second operating member 68 receives a frontward urging force given by the second spring body 70. Specifically, the second spring body 70 which is realized as a coil spring is arranged in the storage space defined in the lid-side brim part 120 and is supported such that one end portion of the second spring body 70 is connected to the lid 24, and the other end portion of the second spring body 70 is connected to the second operating member 68. The second operating member 68 is pressed frontward by the second spring body 70.

As described above, when the lid 24 is closed, the second operating member 68 is kept in a held state with the second movable holder 66. Thus, as with the second operating member 68, the second movable holder 66 is also pressed forward. Accordingly, when no force acting against a spring force of the second spring body 70 is applied to the second operating member 68, the front end portion of the second movable holder 68 is held in conjunction with the holder 55 and the pannier stay 16, and the casing body 22 is maintained in the unremovable state with respect to the vehicle body. Specifically, the holding piece 66 prevents the casing body 22 from moving upward with respect to the pannier stay 16. In addition, the holder 55 prevents the casing body 22 from moving rearward with respect to the pannier stay 16. Further, the holder 55 and the pannier stay 16 prevent the casing body 22 from moving in the vehicle widthwise direction and downward with respect to the pannier stay 16.

When the lid 24 is closed, if an operator slides the second operating member 68 rearward (FIG. 6B), the second movable holder 66 is moved rearward with respect to the casing body 22 in conjunction with the second operating member 68. Thus, the front end portion of the second movable holder 68 is withdrawn from the holding hole 60a of the holder 55 to dissociate the second movable holder 68 and the holder 55. In this state, since the front end portion of the second movable holder 68 is withdrawn rearward from the holding hole 60a of the holder 55, the holder 55 can avoid interfering the upward movement of the casing body 22. Thus, the casing body 22 can be moved upward with respect to the pannier stay 16. When the casing body 22 is moved upward with respect to the pannier stay 16 and the holder 55 is no longer fitted in the fitting recess, the casing body 22 can be detached from the pannier stay 16.

The opening-closing holder (opening prevention part) 42 and the attaching-detaching holder 54 in FIG. 5 can be locked. That is, the opening-closing holder 42 can be locked in a closed state (i.e., an unopenable-unclosable state), and the attaching-detaching holder 54 can be locked at a held position (i.e., an unremovable state). The pannier 14 includes the cylinder 69 which serves to lock both of the attaching-detaching holder 54 and the opening-closing holder 42. This means that the single cylinder 69 can be used to lock and unlock the pannier 14 for attachment to and detachment from the vehicle body as well as the lid 24 of the pannier 14 for opening and closing. In the present embodiment, the cylinder 69 can be angularly displaced between a lock position and an unlock position; at the lock position, the unopenable-unclosable state and the unremovable state are attained, whereas at the unlock position, the openable-closable state and the removable state are attained.

In the present embodiment, the cylinder 69 is a key cylinder which can be locked and unlocked by inserting and turning a key. The cylinder 69 has an axis AX extending in the vertical direction and includes an exposed upper face. The cylinder 69 partially overlaps with the pannier stay 16 when viewed in the axial direction (i.e. the vertical direction). The cylinder 69 includes, on the upper face thereof, a keyhole 69a into which a key is inserted as shown in FIG. 4. The cylinder 69 is turnably supported by the lid 24. That is, the cylinder 69 is relatively movable in conjunction with the lid 24 with respect to the casing body 22. The part of the cylinder 69 other than the keyhole 69a is covered by a cover 76 which is a part of the lid 24 and covers a peripheral surface of the part other than the keyhole 69a from an upper side, a rear side and an inner side in the vehicle widthwise direction. In the present embodiment, the cylinder 69 has an internal structure such that when the key is inserted in the keyhole 69a, the key cannot be removed unless the cylinder 69 is at the lock position.

When the pannier 14 is attached to the pannier stay 16, the cylinder 69 is disposed in an area between the vehicle body frame FR and the storage space S1 in a planar view. Specifically, the lid-side brim part which is located at an inner portion of the rear part of the lid 24 in the vehicle widthwise direction includes a cylinder housing part 71, and this cylinder housing part 71 houses the cylinder 69. The above-described first movable holder and second movable holder (FIG. 6A) are also housed in a space defined within the lid 24. In the present embodiment, the cylinder 69 is arranged adjacent to the third to-be-supported body 38 of the casing body 22.

The cylinder 69 is arranged adjacent to an inner end portion of the first movable holder 104 in the vehicle widthwise direction and to the rear end portion of the second movable holder 68. The cylinder 69 includes locking pieces 72, 74 which are arranged so as to prevent movement of the first movable holder 104 and the second movable holder 68 located adjacent to the respective locking pieces 72, 74, when the cylinder 69 is moved to the lock position. When the cylinder 69 is moved to the unlock position, the locking pieces 72, 74 are moved to retracted positions with respect to the respective movable holders 104, 68. Thus, the locking pieces 72, 74 are released so as not to prevent the movement, so that the respective movable holders 104, 68 are allowed to move.

As shown in FIG. 5, the first locking piece 72 and the second locking piece 74 are located on an outer periphery of the cylinder 69. The first locking piece 72 when at the lock position prevents the first operating member 50 from moving inward in the vehicle widthwise direction. In the present embodiment, the first locking piece 72 is held in a recess (not illustrated) in the first operating member (first operating piece) 50 to prevent the first operating piece 50 from moving in the vehicle widthwise direction.

Figure 10A:
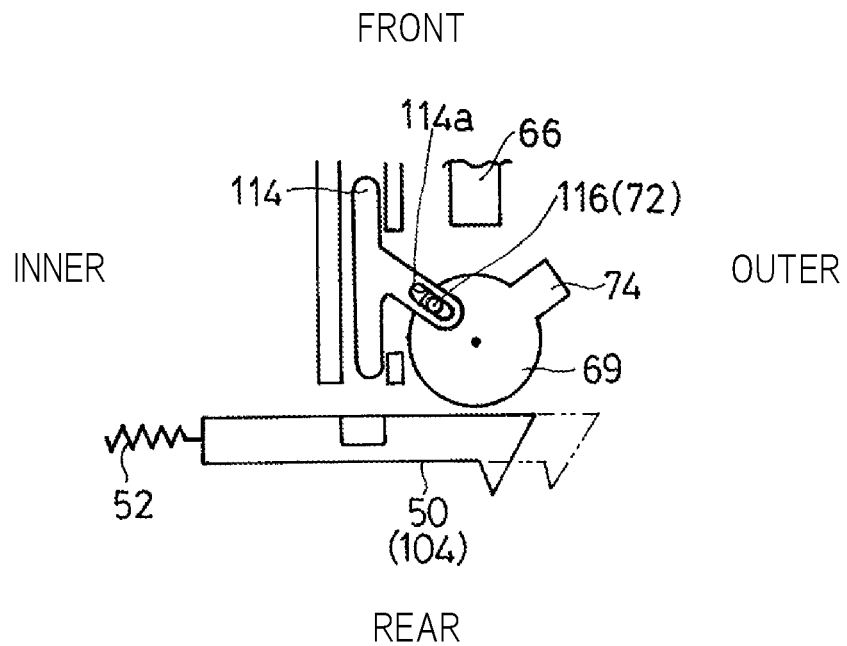
FIG. 10A is a plan view showing a cylinder of the pannier at an unlock position.
Figure 10B:
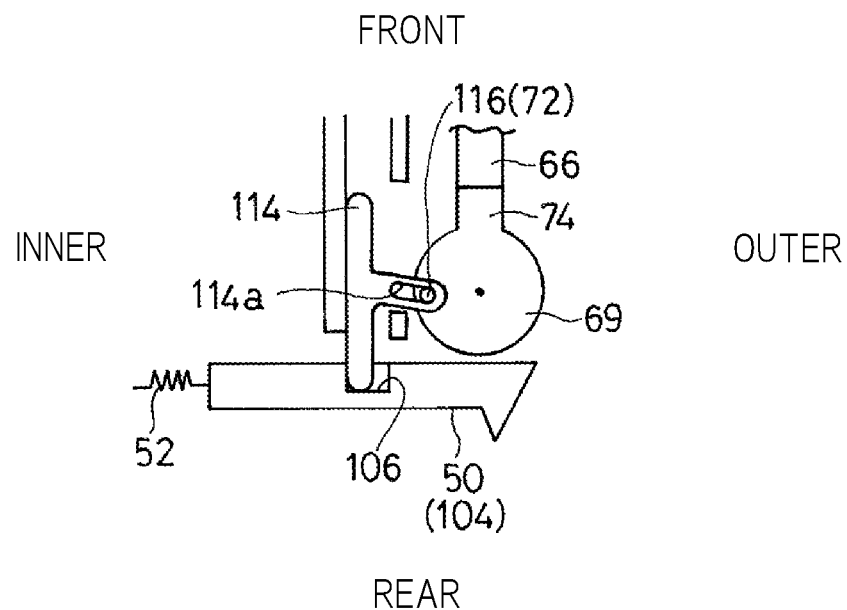
FIG. 10B is a plan view showing the cylinder of the pannier at a lock position.

Specifically, the lock mechanism includes a cam member 114 which operates in conjunction with the cylinder 69 as shown in FIG. 10A and FIG. 10B. The cylinder 69 includes a protrusion 116 which serves as the first locking piece 72 at a radially outer part of the cylinder 69 with respect to the center of rotation. The cam member 114 includes an elongated hole 114a which receives the protrusion 116 on the cylinder 69. The cam member 114 is housed in the lid 24, so that the movement direction of the cam member 114 is directed to the front-rear direction.

The cam member 114 is connected to the protrusion 116 of the cylinder 69, so that the cam member 114 is moved in the front-rear direction in association with the angular displacement of the protrusion 116. When the cylinder 69 is moved to the lock position (FIG. 10B), the cam member 114 is pushed rearward by the protrusion 116 to hold the first movable holder 104 located at the lid holding position. Specifically, a tip end portion of the cam member 114 is fitted into a groove (recess) 106 in the first movable holder 104 so as to prevent the first movable holder 104 from moving in the vehicle widthwise direction. Thus, at the lock position, even if an attempt is made to move the first operating piece 50 in the vehicle widthwise direction, the first locking piece 72 prevents the first operating piece 50 from moving in the vehicle widthwise direction, so that a third party who does not have the key cannot open the lid 24.

When the cylinder 69 is moved to the unlock position with the key (FIG. 10A), the cam member 114 is pushed back frontward in association with the angular displacement of the protrusion 116 so as to dissociate the first movable holder 104 and the cam member 114. In this state, an operator can apply a force to the first operating piece 50 against the urging force by the first spring body 52 to move the first movable holder 104 inward in the vehicle widthwise direction.

The second locking piece 74 when at the lock position prevents the second movable holder 66 from moving in the front-rear direction (FIG. 10B). Specifically, the second locking piece 74 is located at a lower end portion of the cylinder 69. When the lid 24 is closed, the second locking piece 74 is located at a same height as a rear end face of the second movable holder 66. In addition, the second locking piece 74 protrudes radially outward with respect to the rest part of the cylinder.

When the cylinder 69 is moved to the lock position, the second locking piece 74 faces the rear end face of the second movable holder 66 from the rear to prevent the second movable holder 66 from moving rearward. This makes it possible to prevent the movement of the second movable holder 66 from the casing fixing position and thus to prevent attachment and detachment of the pannier 14. Since the second operating member 68 and the second movable holder 66 are held to each other when the lid 24 is closed, at the lock position, even if an attempt is made to move the second operating member 68 rearward, the second locking piece 74 prevents the second holding piece 66 from moving rearward, so that a third party who does not have the key cannot detach the pannier 14 from the vehicle body.

When the cylinder 69 is moved to the unlock position with the key (FIG. 10A), the second locking piece 74 is angularly displaced so as not to face the second movable holder 66. In other words, a gap is generated between the second movable holder 66 and the cylinder 69, so that the second movable holder 66 can be moved rearward. In this state, an operator can apply a force to the second operating member 66 against the urging force by the second spring body 70 to move the second movable holder 66 rearward.

Thus, when the cylinder 69 is turned from the lock position to the unlock position, the first locking piece 72 which serves as the cam member is disengaged from the first movable holder 50, so that the first operating member 50 can be moved in the vehicle widthwise direction when the lid 24 is in the closed state. Therefore, at the pannier opening position, the first operating member 50 is moved outward in the vehicle widthwise direction (to a position indicated with a double dotted line) to move the first holding pieces 48 in the vehicle widthwise direction. Thus, the lid 24 can be opened.

When the cylinder 69 is turned from the lock position to the unlock position, the second locking piece 74 is disengaged from the second movable holder 66, so that the second movable holder 66 can be moved rearward when the pannier 14 is in the unremovable state. Therefore, at the pannier detaching position, the second operating member 68 is moved rearward to move the second movable holder 66 rearward. Thus, the pannier 14 can be removed from the vehicle body.

In the present embodiment, the pannier detaching position and the pannier opening position of the cylinder 69 are located at a same position in a turning direction. Alternatively, these positions may be different. For example, the pannier opening position may be located at a position angularly displaced from the lock position by a predetermined angle, and the attaching-detaching position may be located at a position where the cylinder 69 is angularly displaced from the pannier opening position. Further, in the present embodiment, the axial direction of the cylinder 69 corresponds to the vertical direction of the vehicle. However, the axial direction is not limited to the vertical direction and may correspond to, for example, the vehicle widthwise direction or the front-rear direction of the vehicle.

As described above, at the lock position, the second movable holder 66 and the first holding pieces 48 are fixed at positions where the casing body 22 cannot be removed from the vehicle body, and the lid 24 cannot be opened with respect to the casing body 22. At the pannier detaching position, the second movable holder 66 can be moved to a position where the casing body 22 can be removed from the vehicle body. Further, at the pannier opening position, the first holding pieces 48 can be moved to a position where the lid 24 can be opened with respect to the casing body 22.

When the cylinder 69 is at the lock position, the first holding pieces 48 come into contact with the holding wall 112 on the casing side, so that the lid 24 is prevented from closing. This allows an operator to determine that the lid 24 is not closed with the cylinder 69 at the lock position. In this way, a user is encouraged to perform a lock operation when the lid 24 is closed. This makes it possible to prevent the lid 24 from opening unintentionally and to prevent the pannier 14 from detaching unintentionally from the vehicle body.

The pannier 14 according to the present embodiment includes indicators (warning indicators) 75A, 75B which indicates when the second movable holder 66 is not at the lock position. The indicator 75A is located on an upper face of the second operating member 68 (FIG. 8B), and the indicator 75B is located in a movement area for the second operating member 68 on an upper face of the lid 24 (FIG. 8C). Specifically, the indicator 75A is located at a rear half of the upper face of the second operating member 68, and the indicator 75B is located at a rear part of the movement area for the second operating member 68 on the upper face of the lid 24. In the present embodiment, the indicators 75A, 75B are red marks on the upper face of the second operating member 68 and the upper face of the lid 24. However, the indicator 75A, 75B are not limited to red marks.

When the second operating member 68 is moved in the front-rear direction, the rear half of the second operating member 68 is moved into and out of the cover 76. That is, as indicated by a double dotted line 300 in FIG. 6A, when the second movable holder 66 is not at the lock position, the second holding piece 66 is moved frontward by the urging force of the second spring body 70, and the indicator 75A on the upper face of the second operating member 68 is exposed so as to be visible as shown in FIG. 8B. As indicated by a double dotted line 200 in FIG. 6A, when the second holding piece 66 is caught by the holder 55 and thus cannot be held in the holding hole 60a, the second holding piece 66 is moved rearward, and the indicator 75B on the upper face of the cylinder housing part 71 is exposed so as to be visible as shown in FIG. 8C.

As indicated with a solid line in FIG. 6A, on the other hand, when the second movable holder 66 is at the lock position, the second movable holder 66 is held and retained in the holding hole 60a of the holder 55, so that the indicators 75A, 75B are not exposed as shown in FIG. 8A. This makes it easy to visually know that the pannier 14 is attached to the vehicle body. Alternatively, it is possible to provide either the indicator 75A on the upper face of the second operating member 68 or the indicator 75B on the upper face of the lid 24 only. Further, the indicators 75A, 75B may be omitted.

The effects of the pannier 14 according to the present embodiment will be described. To remove the pannier 14 shown in FIG. 2 from the vehicle body or to open the lid 24 of the pannier 14, the key is inserted into the keyhole 69a of the cylinder 69 and is turned in a rotation direction R1. In the present case, the key(s) is(are) turned in the same rotation direction R1 in both the left and right panniers 14. Since the cylinders 69 are located at the rear end portions of the panniers 14, key operations would be performed from the rear of the vehicle body. This configuration provides good handleability because the key operations can be performed in the same direction for both the left and right panniers 14. However, the left and right pannier 14 may have different turning directions for the key(s).

When the cylinder 69 is turned in the rotation direction R1, the cylinder 69 is moved from the lock position to the pannier detaching position and the pannier opening position. Thus allows the pannier 14 to be removed from the vehicle body and allows the lid 24 to be opened. At the pannier opening position, the first operating member 50 can be moved inward in the vehicle widthwise direction. Since the first operating member 50 is located on a rear face of the pannier 14 and the lid 24 is opened from the rear to the front, it is easy to open and close the lid 24 from the rear of the vehicle body. This provides good handleability starting from a key operation to an opening/closing operation of the lid 24.

At the pannier detaching position, the second operating member 68 can be moved rearward. Since the second operating member 68 is located at the rear part of the pannier 14 and the handle 30 is located at the rear face of the pannier 14, it is easy to perform a detaching operation of the pannier 14 from the rear. Thus, in the present embodiment, it is easy to perform all of a key operation, an opening/closing operation of the lid 24, and a detaching operation of the pannier 14 from the rear, so that good handleability is achieved.

Where the top casing 20 is disposed, a lid of the top casing 20 may also be constructed to be opened from the rear to the front, so that all of the panniers 14 and the top casing 20 can be operated from the rear, which further enhances handleability.

According to the above constitution, it is possible to lock and unlock the pannier 14 for attachment to and detachment from the vehicle body as well as the lid 24 for opening and closing through a turning operation of each cylinder 69 as shown in FIG. 2. Therefore, as compared with a case where the pannier 14 includes separate lock structures for these operations, the pannier 14 includes a reduced number of components and have improved handleability.

Further, thanks to the indicators 75A, 75B which indicate when the cylinder 69 is not at the lock position as shown in FIG. 8B and FIG. 8C, it is possible to visually know the lock state of the attaching-detaching holder 54. Thus, it is possible to prevent a driver from driving the vehicle with the attaching-detaching holder unlocked.

When the lid 24 is open with respect to the casing body 22 and the cylinder 69 is at the lock position, the opening prevention part 42 is in contact with the cylinder 69 to prevent the lid 24 from closing. Thus, if the lid 24 cannot be closed, a user would be more likely to notice that the cylinder 69 is at the lock position with the lid 24 open, so that the user is encouraged to perform a lock operation with the lid 24 closed.

The cylinder 69 and the holder 55 as shown in FIG. 6A are disposed adjacent to the third to-be-supported body 38. Thus, there is a smaller distance between the second movable holder 66 and the third to-be-supported body 38, which can prevent increase in the size of the holding piece 66.

The second movable holder 66 and the cylinder 69 are disposed in an area between the rear frame 2 and the storage space S1 as shown in a plan view of FIG. 2. Thus, the second movable holder 66 and the cylinder 69 are disposed on the inner side in the vehicle widthwise direction with respect to the casing body 22, so that it is possible to prevent damage to the second movable holder 66 and the cylinder 69 when the vehicle body is overturned.

As shown in FIG. 6A, the second movable holder 66 and the cylinder 69 are located within the cylinder housing part 71 in the lid 24. In such a case where the second movable holder 66 and the cylinder 69 are located in the lid 24, it is easier to arrange them at peripherally exposed positions in the pannier 14 than in a case where they are located in the casing body 22. This provides easier access to the cylinder 69 and provides good handleability.

Further, there is the second operating member 68 which moves the second movable holder 66. Therefore, a driver can use the second operating member 68 to move the second movable holder 66, which enhances handleability when the pannier 14 is attached to and detached from the vehicle body.

Since the lid 24 as shown in FIG. 2 is constructed to be opened from the rear to the front when mounted on the vehicle body, the lid 24 is unlikely to open during driving. Further, since the handle 30 is located on the rear face of the casing body 22, it is easy to perform an opening/closing operation of the lid 24 and a detaching operation of the pannier 14 from the rear of the vehicle body, so that good handleability is achieved. This also makes it possible to restrain an opening/closing operation of the lid 24 by a driver while driving.

The cylinder 69 as shown in FIG. 6A has the axis AX extending in the vertical direction and includes the exposed upper face. The cylinder 69 partially overlaps with the pannier stay 16 when viewed in the axial direction. Thus, the cylinder 69 is arranged above the pannier stay 16, so that it is possible to prevent reduction of the storage space S1 due to the cylinder 69 and suppress increase in the dimension in the vehicle widthwise direction.

Since the handle 30 is located at a position adjacent to the cylinder 69 and the second operating member 68, an unlock operation of the pannier 14 and a transport operation of the pannier 14 using the handle 30 can be more easily performed, so that convenience is improved. The handle 30 can be used to transport the pannier 14 and to move the pannier 14 when the pannier 14 is attached to or detached from the pannier stay 16, so that the structure can be simplified as compared with a case where the pannier 14 includes separate handles 30 for these operations.

Since the tab part is arranged at a position adjacent to the cylinder 69 and the first operating piece 50, an unlock operation of the lid 24 and an opening/closing operation of the lid 24 using the tab part can be more easily performed. Further, since the handle 30 of the casing body 22 and the tab part of the lid 24 are vertically arranged, a transport operation of the pannier 14 and an opening/closing operation of the lid 24 can be more easily performed.

The respective operating pieces 50, 68 and the cylinder 69 are arranged on the inner side in the vehicle widthwise direction in the pannier 14. Thus, even if the vehicle comes close to or into contact with an obstacle, the operating pieces 50, 68 can be prevented from coming into contact with the obstacle, so that the operating pieces 50, 68 are more likely to be protected against damage.

Since the cylinder 69 is constructed such that the key cannot be inserted or removed unless the cylinder 69 is at the lock position, the cylinder 69 is prevented from being kept at the unlock position when the key is removed. Thus, when the key is removed from the cylinder 69, the cylinder 69 is necessarily put into the lock state, so that antitheft performance is improved. Since the holder 55 and the cylinder 69 are arranged at adjacent positions, the second movable holder 66 can be prevented from having an increased size.

Since the lid-side brim part is arranged above the pannier stay 16 in an overlapping manner, it is possible to prevent increase in the size of the pannier 14 in the vehicle widthwise direction, as compared with a case where the pannier stay 16, the cylinder 69 and the like are arranged next to one another in the vehicle widthwise direction.

Since the first operating piece 50, the second operating piece 68 and the cylinder 69 are located in the lid, they can be arranged at higher positions than those in a case where they are located in the casing body, so that an operator can more easily perform an operation. Since the cylinder 69 is located in the lid, it is possible to hinder a lock/unlock operation while the lid is open.

Since the various mechanisms are arranged outside the storage space S1, there is less unevenness inside the storage space S1, so that an item can be smoothly taken out from the storage space. Since the first movable holder 104 and the second movable holder 66 are arranged outside the storage space S1 and in a space walled off from the storage space S1, it is possible to avoid contact between an item(s) and the respective movable holders 104, 66 to prevent the item(s) from interfering the movement of the movable holders 104, 66.

In the present disclosure, the movable holder may further include a warning indicator which indicates when the movable holder is at the attachable-detachable position. According to this constitution, it is possible to visually know the state of the movable holder. Thus, a user can visually see the warning indicator to know that the pannier is not secured in an unremovable manner. By allowing the user to know such a warning, it is possible to prevent the user from driving the vehicle when the movable holder is at the attachable-detachable position, and thus to prevent detachment of the pannier while driving.

In the present disclosure, the pannier may include a preventer which is in contact with the cylinder to prevent the lid from closing when the lid is open with respect to the casing body and the cylinder is at the lock position. According to this constitution, if the lid cannot be closed, a user would be more likely to notice that the cylinder is at the lock position with the lid open, so that the user is encouraged to perform a lock operation with the lid closed.

In the present disclosure, the casing body may include a to-be-supported body to be supported on the vehicle body, and the cylinder may be arranged adjacent to the to-be-supported body. According to this constitution, there is a smaller distance between the cylinder and the to-be-supported body, which can prevent increase in the size of the movable holder interposed between the cylinder and the to-be-supported body.

In the present disclosure, the cylinder may be arranged in an area closer to the vehicle than the storage space for the item is to the vehicle when the pannier is attached to the vehicle. According to this constitution, the cylinder is located on the inner side in the vehicle widthwise direction with respect to the lid, so that it is possible to prevent the cylinder from being damaged when the vehicle body is overturned.

In this case, the cylinder may be disposed within a cylinder housing part in the lid. According to this constitution, since the cylinder is disposed in the lid, the cylinder can be arranged at a more accessible position for a user than that in a case where the cylinder is disposed in the casing body, so that handleability is improved.

In the present disclosure, the pannier may include an operation piece which is operable by an operator to move the holding piece. According to this constitution, an operator can move the holding piece with the operation piece to undo the lock. This necessitates an operation by an operator in order to undo the lock, so that it is possible to prevent unintentional unlocking.

In the present disclosure, the lid may be constructed to open from the rear to the front when the pannier is attached to the vehicle, and the casing body may include a handle on a rear face of the casing body. According to this constitution, since the lid is constructed to open from the rear to the front, the lid is unlikely to open during driving. Further, an opening/closing operation of the lid and a detaching operation of the pannier can be performed from the rear of the vehicle, which provides good handleability.

A vehicle according to the present disclosure includes: the pannier according to the present disclosure; a vehicle frame; and a pannier stay which supports the casing body on the vehicle frame, wherein the cylinder has an axis extending in a vertical direction and includes an upper face exposed from the lid, and the cylinder partially overlaps with the pannier stay when viewed in a direction of the axis. According to this constitution, since the cylinder is located above the stay, it is possible to prevent reduction of the storage space due to the cylinder and suppress increase in the dimension in the vehicle widthwise direction of the vehicle as a whole including the pannier.

The present disclosure is not limited to the above embodiment, various additions, modifications, or deletions may be made without departing from the scope of the disclosure. The first movable holder 104 and the second movable holder 66 may be a single member. For example, the first movable holder 104 may be located on an inner side of the pannier 14 in the vehicle widthwise direction and be integrated with the second operating member 68. The pannier may have a structure in which a single operating piece is used to perform an operation to attain the attachable-detachable state and the openable-closable state. Thus, the number of components can further be reduced.

In addition to indicating a warning when the cylinder is not at the lock position, the indicator 75 may indicate when the cylinder is at the lock position. The keyhole 69a may be located away from the cylinder 69. In such a case, there should be a first cylinder which includes the keyhole 69a as well as a turning force transmission mechanism (such as a cable) which transmits a turning force from the first cylinder to a second cylinder for the lock of the holding piece. The cylinder 69 may be arranged at a front end of the pannier 14 and on the inner side in the vehicle widthwise direction. In this case, the first movable holder 104 and the second movable holder 66 should also be located on the front side of the pannier 14.

If the first movable holder is located opposite from the hinge 40, the lid 24 can be more easily prevented from opening. Where the second operating member 68 is located in the lid, and the second movable holder 66 is located in the casing, it is possible to achieve both handleability and strength when the pannier is mounted. Further, if the entire first movable holder except for the operation part is received in the lid 24, it is possible to prevent an item or an obstacle from interfering with the movement of the movable holder.

The pannier 14 is expected to be mounted at an outwardly exposed position on the vehicle. Thus, a user can access the pannier from a position around the vehicle to take out an item within the pannier 14 and detach the pannier 14 from the vehicle to transport the whole pannier 14 including the item(s). The vehicle according to the above embodiment is a mere example, and the present disclosure may be applied to any vehicle other than a motorcycle. For example, the vehicle may be a saddle-riding vehicle such as a motorcycle and a three-wheeler, a convertible without a body which covers a vehicle inner space, or a service vehicle.

The pannier 14 according to the above embodiment is described with reference to a case where the pannier is disposed on each of the left and right sides of the vehicle. The present disclosure also includes a case where the pannier is disposed on only one side of the vehicle. The present disclosure further includes a case where the pannier is disposed at a position other than the left and right sides, such as at an upper position of the vehicle.

What is claimed is:

1. A pannier for item storage to be attached to a vehicle, the pannier comprising:
   a casing body which defines a storage space which receives an item and includes an opening through which the item is placed into and taken out from the storage space;
   a lid which closes the opening of the casing body;
   an attaching-detaching holder which removably attaches the casing body to the vehicle;
   an opening-closing holder which attaches the lid to the casing body in an openable and closeable manner;
   a cylinder which serves to lock both of the attaching-detaching holder and the opening-closing holder; and
   a movable holder which is movable when the cylinder is unlocked,
   wherein the cylinder is turned to a lock position, a pannier detaching position and a pannier opening position,
   the opening-closing holder includes an opening prevention part which switches the lid between an unopenable-unclosable state and an openable-closable state,
   the movable holder includes:
      a first movable holder which can move between a position where the lid is openable and a position where the lid is unopenable; and
      a second movable holder which can move between a position where the casing body is removable and a position where the casing body is unremovable,
   when the cylinder is at the lock position, the second movable holder is retained by the cylinder at a position where the casing body is unremovable from the vehicle and the first movable holder is retained by the cylinder at a position where the lid is unopenable with respect to the casing body,
   when the cylinder is at the pannier detaching position, the second movable holder is movable to an attachable-detachable position where the second movable holder allows the casing body to be attached to and detached from the vehicle,
   when the cylinder is at the pannier opening position, the first movable holder is movable to an openable position where the first movable holder allows the lid to be opened with respect to the casing body,
   the cylinder is arranged rearward of at least a portion of the attaching-detaching holder and on an inner side of the opening prevention part in a vehicle widthwise direction, and
   a movement direction of the first movable holder is across a movement direction of the second movable holder.

2. The pannier as claimed in claim 1, further comprising a warning indicator which indicates when the second movable holder is at the attachable-detachable position.

3. The pannier as claimed in claim 1, wherein:
   the casing body includes a plurality of to-be-supported bodies to be supported on the vehicle body,
   at least two to-be-supported bodies of the to-be-supported bodies are arranged in line in the front-rear direction of the vehicle, and
   the cylinder is arranged adjacent to one of the to-be-supported bodies which are arranged in line in the front-rear direction of the vehicle.

4. The pannier as claimed in claim 3, wherein the second movable holder is arranged adjacent to the to-be-supported body to which the cylinder is closest.

5. The pannier as claimed in claim 1, wherein the cylinder is arranged in an area closer to the vehicle than the storage space for the item is to the vehicle when the pannier is attached to the vehicle.

6. The pannier as claimed in claim 5, wherein the cylinder is disposed within a cylinder housing part in the lid.

7. The pannier as claimed in claim 1, further comprising an operation piece which is operable by an operator to move the movable holder.

8. The pannier as claimed in claim 1, wherein the lid is constructed to open from the rear to the front when the pannier is attached to the vehicle, and
   the casing body includes a handle on a rear face of the casing body.

9. The pannier as claimed in claim 8, wherein the lid is constructed to be opened from the rear to the front of the vehicle.

10. A vehicle comprising:
the pannier as claimed in claim 1;
a vehicle frame; and
a pannier stay which supports the casing body on the vehicle frame,
wherein the cylinder has an axis extending in a vertical direction and includes an upper face exposed from the lid, and the cylinder partially overlaps with the pannier stay when viewed in a direction of the axis.

11. The pannier as claimed in claim 1, wherein:
the cylinder is a key cylinder which is turned to the lock position, the pannier detaching position and the pannier opening position by inserting and turning a key,
the cylinder has an outer periphery provided with: a first locking piece which engages with the first movable holder to prevent the first movable holder from moving; and a second locking piece which engages with the second movable holder to prevent the second movable holder from moving,
when the cylinder is at the lock position, the second movable holder is retained by engaging with the second locking piece at a position where the casing body is unremovable from the vehicle and the first movable holder is retained by engaging with the first locking piece at a position where the lid is unopenable with respect to the casing body,
when the cylinder is at the pannier detaching position, the second movable holder is movable to the attachable-detachable position by disengaging with the second locking piece, and
when the cylinder is at the pannier opening position, the first movable holder is movable to the openable position by disengaging with the first locking piece.

12. The pannier as claimed in claim 1, wherein the cylinder is a key cylinder which is turned to the lock position, the pannier detaching position and the pannier opening position by inserting and turning a key,
further comprising a cam member which operates linearly in conjunction with the cylinder, wherein
when the cylinder is at the lock position, the first movable holder is retained by fitting the cam member into a groove defined in the first movable holder, at a position where the lid is unopenable with respect to the casing body.

* * * * *